United States Patent
Mothaffar

(10) Patent No.: US 7,926,839 B1
(45) Date of Patent: Apr. 19, 2011

(54) HEAD AND NECK RESTRAINT SYSTEM

(76) Inventor: Hussain Y. A. M. Mothaffar, Al-Salmiya (KW)

( * ) Notice: Subject to any disclaimer, the term of this patent is extended or adjusted under 35 U.S.C. 154(b) by 0 days.

(21) Appl. No.: 12/706,899

(22) Filed: Feb. 17, 2010

(51) Int. Cl.
*B60R 21/16* (2006.01)
(52) U.S. Cl. ..................................... 280/730.1; 280/733
(58) Field of Classification Search ............... 280/730.1, 280/733
See application file for complete search history.

(56) References Cited

U.S. PATENT DOCUMENTS

| | | | |
|---|---|---|---|
| 3,948,541 A | | 4/1976 | Schulman |
| 3,953,049 A | * | 4/1976 | Surace et al. ............... 280/730.1 |
| 5,282,648 A | | 2/1994 | Peterson |
| 5,402,535 A | * | 4/1995 | Green ............................... 2/468 |
| 5,758,900 A | * | 6/1998 | Knoll et al. ..................... 280/733 |
| 6,237,945 B1 | | 5/2001 | Aboud et al. |
| 6,705,641 B2 | | 3/2004 | Schneider et al. |
| 6,729,643 B1 | | 5/2004 | Bassick et al. |
| 7,150,468 B2 | * | 12/2006 | Pan ............................. 280/730.1 |
| 7,426,773 B2 | * | 9/2008 | Downing et al. ................. 24/628 |
| 7,665,761 B1 | * | 2/2010 | Green et al. .................... 280/733 |
| 7,703,152 B2 | * | 4/2010 | Rhodes et al. ..................... 2/421 |
| 7,748,736 B2 | * | 7/2010 | Turner et al. .................... 280/733 |
| 2009/0179406 A1 | * | 7/2009 | Haraoka et al. ................ 280/733 |
| 2009/0236828 A1 | * | 9/2009 | Foubert et al. ............. 280/728.2 |

FOREIGN PATENT DOCUMENTS

JP    2007321305 A   *   12/2007

* cited by examiner

*Primary Examiner* — Faye M. Fleming
(74) *Attorney, Agent, or Firm* — Lowe Hauptman Ham & Berner, LLP

(57) ABSTRACT

A head and neck restraint system for an individual in a motor vehicle includes a securely anchored seat with a conventional lap belt and shoulder belt with the lap belt extending across an individual's lap and pelvic region. The shoulder belt is fixed above and behind the individual's shoulder and extends across the individual's chest. An adjustment mechanism is used to position an airbag in a centered position in front of the individual's chest. The airbag includes a lower frontal portion and two upwardly extending portions along the sides of the individual's head. In addition, the system includes a collar portion and two face protecting portions extending across the upper and lower portions of the individual's face between the two upwardly extending portions.

7 Claims, 3 Drawing Sheets

HEAD AND NECK RESTRAINT SYSTEM

FIELD OF THE INVENTION

This invention relates to a head and neck restraint system for an individual in a motor vehicle and more particularly to an improved seatbelt/shoulder belt/airbag system for protecting an individual from injury to their head and neck during an accident.

BACKGROUND FOR THE INVENTION

Restraints including seatbelts, shoulder harnesses and airbags are well known and have been in use for many years. For example, a U.S. Patent of Schulman, U.S. Pat. No. 3,948,541 discloses a vehicle occupant restraint system wherein a bladder member comprises a central pocket portion in fluid communication with two pelvic bags and two chest bags. The chest bags are additionally interconnected with a chin bag member. Upon impact the bladder member automatically inflates to thereby cushion the pelvic and chest areas against the forces of the collision and simultaneously the chin bag member inflates to thereby prevent rotation of the vehicle occupant's chin into his chest.

A more recent patent of Knoll et al., U.S. Pat. No. 5,758,900 discloses a protection system for a competition vehicle driver that has shoulder belt parts provided with one shoulder air bag respectively which can be inflated within fractions of a second and can be emptied again in an energy consuming manner. In the inflated condition, the shoulder air bags are supported on the driver's shoulder regions and support a protective helmet form below against a lateral tilting.

In addition to the above, a U.S. Pat. No. 6,729,643 of Bassick et al. discloses a harness and helmet for racing and an inflatable collar to surround the driver's neck. The Bassick et al. reference discloses a neck support and head restraint for a high performance racing vehicle or the like in which the torso of the driver is restrained in a seat by a harness that includes shoulder straps extending over the driver's shoulders, and a helmet is worn by the driver. A neck support and head restraint device comprises an inflatable collar configured and dimensioned to surround the driver's neck at a location between the driver's helmet and shoulders. The collar is anchored to the shoulder straps of the restraining harness. At least one and preferable two tethers are strategically connected at opposite ends to the collar and the helmet. The collar is normally in a pliable collapsed state, with the tethers loosely extending between the helmet and collar to thereby accommodate relatively unimpeded head movement. In an emergency situation, the collar is instantaneously inflated to a relatively stiff expanded state that tensions the tethers, resulting in the rear portion of the helmet being pulled down against the collar to thereby provide beneficial neck support and head restraint.

Further, a U.S. Patent No. of Schneider et al., U.S. Pat. No. 6,705,641 discloses an inflatable seat belt system. As disclosed, the system includes inflatable shoulder belts and lap belts which may or may not be inflatable. Each inflatable belt includes seat belt webbing having an interior cavity in which an inflatable member is placed. The seat belt webbing also includes a frangible seam that bursts upon inflation of the inflatable member. The inflatable seat belt system may also include one or more anti-submarining (crotch) belts that prevent an occupant from slipping underneath the protection of the lap and shoulder belts.

Notwithstanding the above, it is presently believed that there is a need and a potential commercial market for an improved head and neck restraint system in accordance with the present invention. There should be a demand and a commercial market for such systems because they provide added protection to an individual in the event of a serious accident and are believed to be capable of being manufactured and sold at a competitive price, being durable, and reliable.

BRIEF SUMMARY OF THE INVENTION

In essence a head and neck restraint system for a driver or passenger in a motor vehicle includes a seat for an individual. The seatbelt extends across an individual's lap in the seat and a shoulder belt extends across an individual's chest and is fixed at one end thereof to a portion of the motor vehicle. At an opposite end, the belt is releaseably fastened to a portion of the motor vehicle adjacent the individual. In addition, an inflatable air bag is fixed to the shoulder belt in front of the individual's chest and is constructed and arranged to inflate outwardly therefrom. The inflatable airbag also includes a lower frontal portion and an upwardly extending portion including a partial collar portion, an upwardly extending head restraining portion, a lower face protecting portion extending across a lower portion of an individual's face and upper face protecting portion extending across an upper portion of an individual's face. In addition, the system includes means for producing pressurized gas in the airbag upon reception of a command signal.

The invention will now be described in connection with the accompanying drawings wherein like reference numerals have been used to indicate like parts.

DESCRIPTION OF THE PREFERRED EMBODIMENTS OF THE INVENTION

Figure 1:
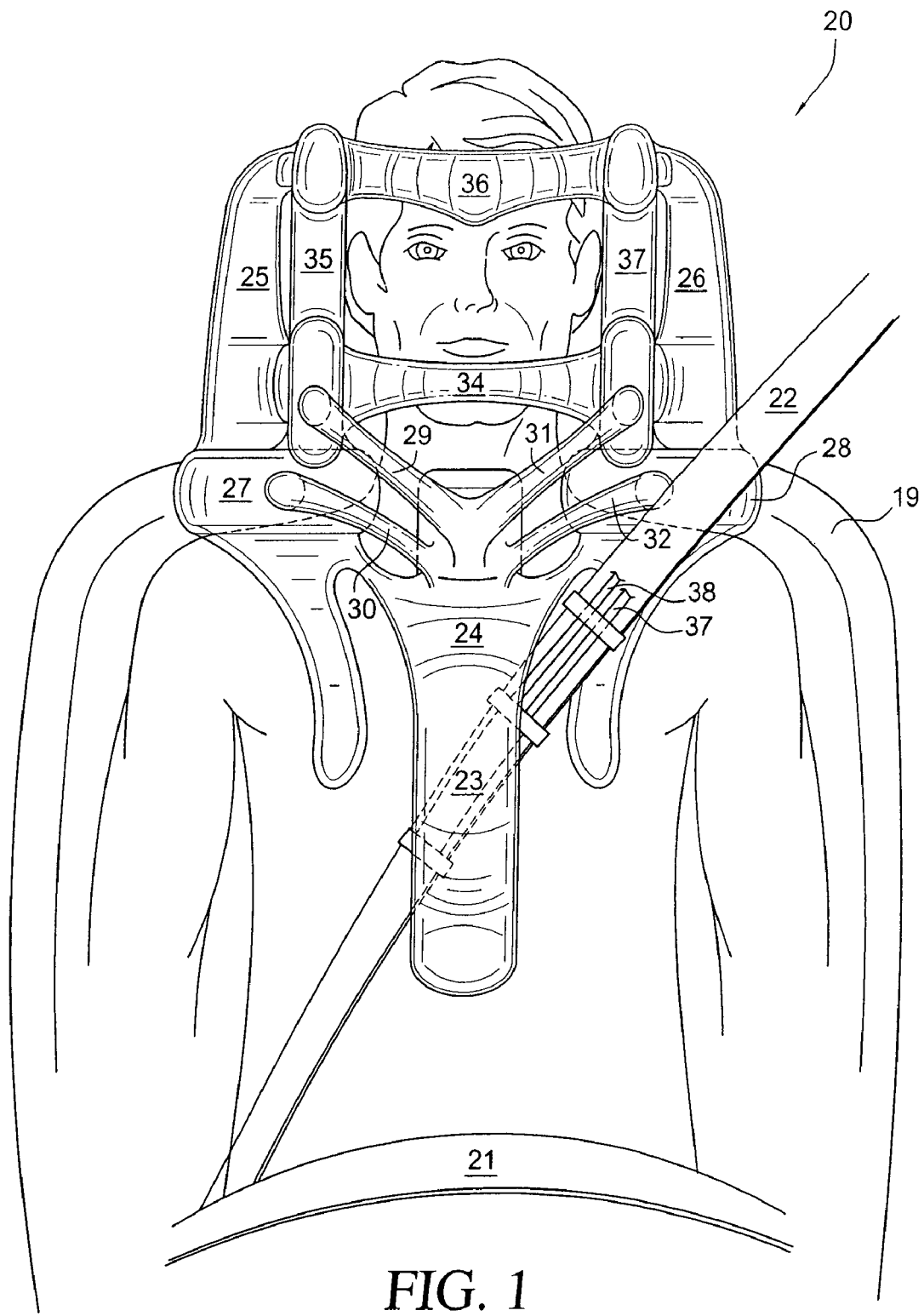
FIG. 1 is a front elevational view of a head and neck restraint system in accordance with the present invention with the system fully inflated.
Figure 2:
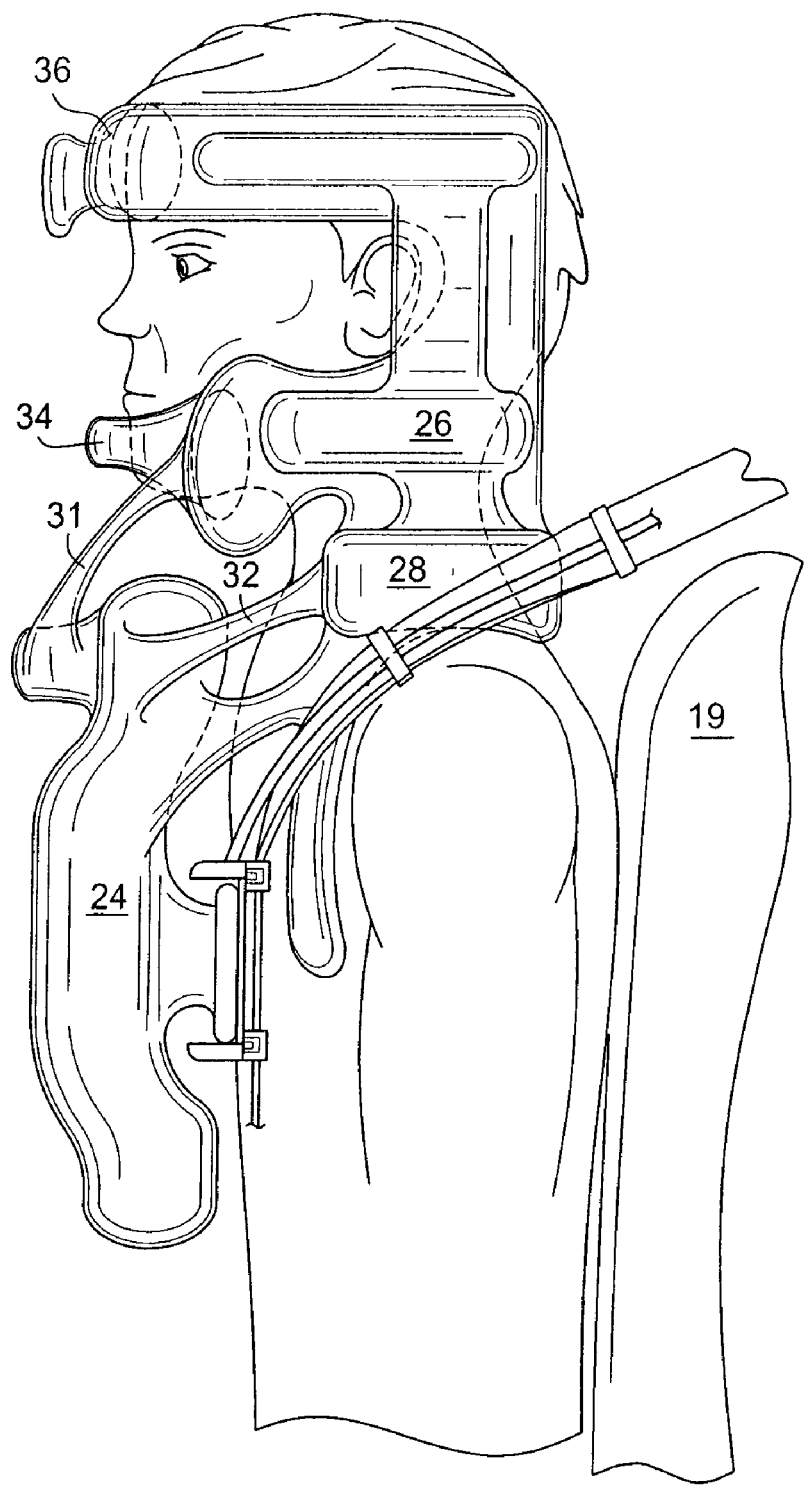
FIG. 2 is a side elevational view of the head and neck restraint system shown in FIG. 1.

As illustrated in FIGS. 1 and 2, a head and neck restraint system 20 includes a conventional lap belt 21 that extends across an individual's lap and pelvic region. A retractable shoulder belt 22 is also of conventional design and is anchored at one end thereof above and behind an individual's seat 19 and is fastened at an opposite end to an inner side of the individual's seat at or near the individual's pelvic region or to an inner end of the lap belt 21.

An inflatable airbag 23 is positioned at a center position between the individual's shoulders and pelvic region where the shoulder belt 22 crosses the individual's chest. Then in the event of an accident the airbag is inflated in a conventional manner. However, the airbag has a unique shape and includes a lower frontal portion 24 and two upwardly extending portions 25 and 26 connected to the partial collar portions 27 and 28 by four conduits 29, 30, 31 and 32. The airbag 23 is actuated in the event of an accident to fully inflate the head and neck restraint system 20.

The head and neck restraint system also includes a lower face protecting element 34 and an upper face protecting element 36 independent of the lower face protecting element 34. Each of the lower face protection element 34 and upper face protection element 36 are in the form of an inflated cross bar that extends around the frontal half of an individual's head between the upwardly extending portions 25 and 26. The system 20 also includes an inner pair of upwardly extending inflatable elements 35 and 37 that extend upwardly next to the sides of the individual's head and over a portion of the individual's ears to further protect the individual's head in the event of an accident.

The collar portions 27 and 28 extends around the back of an individual's neck and abuts the base of the individual's head to prevent the head from tilting rearwardly while the elements 34 and 36 minimize any rotation in a frontal direction. In addition, a signal wire 37 carries a signal to the airbag to thereby expand the inflatable airbag 23. A second wire 38 also carries a signal to alert a monitoring system that the airbag has been deployed.

Figure 3:
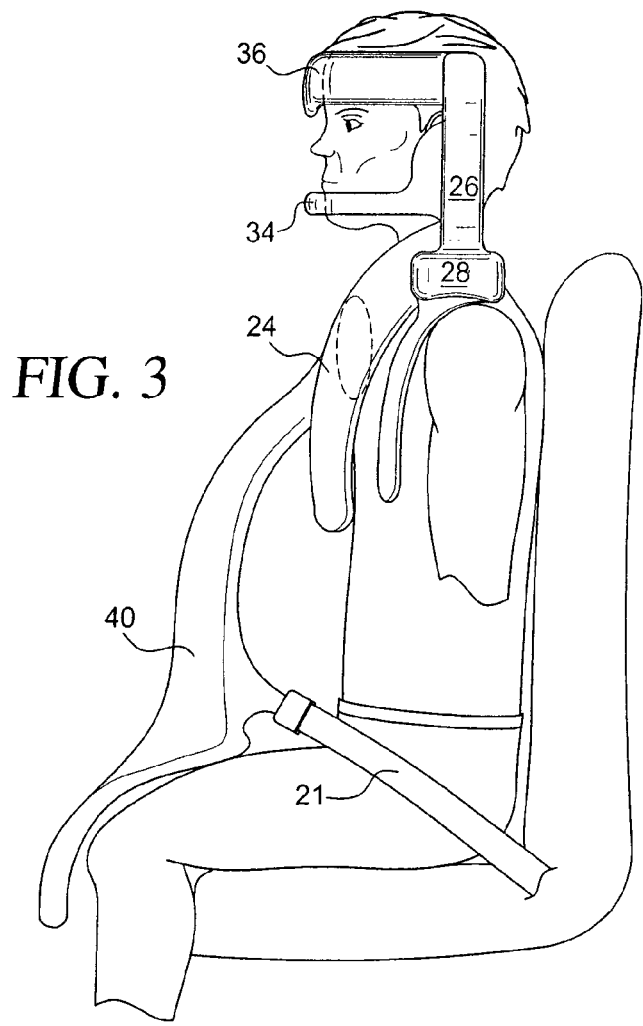
FIG. 3 is a side elevational view of a head and neck restraint system in accordance with a second embodiment of the invention.

As illustrated in FIG. 3, a second embodiment of the invention also includes a lower airbag 40 positioned in front of a lower portion of an individual's body and may include a separate airbag positioned on the lap belt 21. This lower airbag protects an individual's thighs and knees during an accident.

Figure 4A:
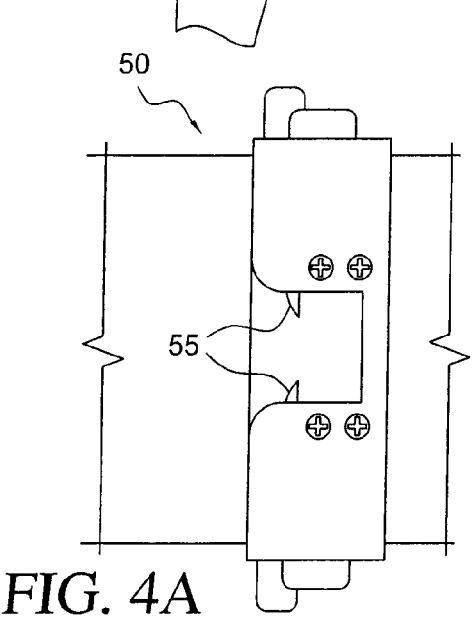
FIG. 4A is a top view of an adjustment mechanism for adjusting the position of the head and neck restraint system to accommodate individuals of different heights.
Figure 4B:
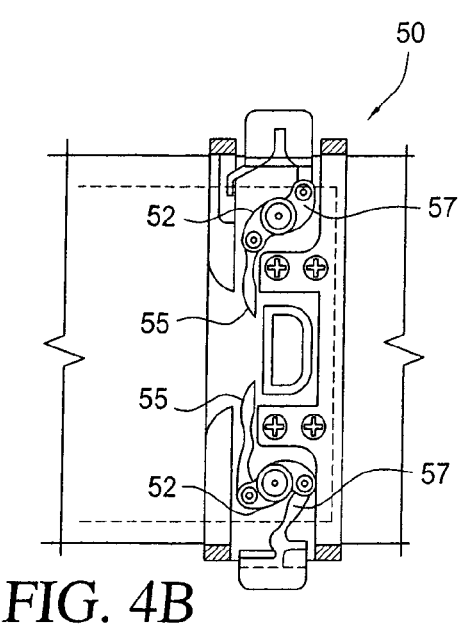
FIG. 4B is a cross-sectional view of the adjustment mechanism shown in FIG. 4A.

Referring now to FIGS. 4A and 4B, a positioning mechanism 50 is attached to the shoulder belt 22 and includes a latch mechanism 52 that engages a track (not shown). The latch mechanism includes a pair of pawls 55 that are actuated and or released by a plurality of levers 57 in a conventional spring biased manner.

While the invention has been described in connection with the accompanying drawings it should be recognized that changes and modifications may be made therein without departing from the scope of the appended claims.

What is claimed is:

1. A head and neck restraint system for an individual in a motor vehicle, said system comprising:
   a seat for an individual, a seatbelt extending across an individual's lap and a shoulder belt extending across the individual's chest and fixed at one end thereof to a portion of a motor vehicle behind the individual and an opposite end thereof releaseably fastened to a portion of the motor vehicle adjacent the individual's lap;
   an inflatable airbag fixed to said shoulder belt in front of the individual's chest constructed and dimensioned to inflate outwardly therefrom and wherein said inflatable airbag includes a lower frontal portion and an upwardly extending portion including a partial collar portion;
   a lower body protecting portion that extends downwardly from said lower frontal portion to protect the thighs and knees of the individual;
   an upwardly extending head restraining portion;
   a lower face protecting portion extending across a lower portion of the individual's face and an upper face protecting portion extending across an upper portion of the individual's face; and
   means for producing pressurized gas in said airbag upon reception of a command signal.

2. A head and neck restraint system for an individual in a motor vehicle according to claim 1 in which said upwardly extending portion extends upwardly on the sides of an individual's head and over at least a portion of an individual's ear.

3. A head and neck restraint system for an individual in a motor vehicle according to claim 2 that includes gas inflation conduits extending from said lower frontal portion to two sides of said collar portion and two sides of said upwardly extending head restraining portion.

4. A head and neck restraint system for an individual in a motor vehicle according to claim 3 in which said lower face protecting portion extends across an area of an individual's face between an individual's lower lip and chin.

5. A head and neck restraint system for an individual in a motor vehicle according to claim 4 in which said upper face protecting portion extends across an individual's forehead.

6. A head and neck restraint system for an individual in a motor vehicle according to claim 5 in which said upwardly extending portion engages the top of an individual's shoulders.

7. A head and neck restraint system for an individual in a motor vehicle according to claim 6 which includes a switch and a fastener so that said airbags will not inflate unless said belt is fastened across an individual's chest.

\* \* \* \* \*